(12) United States Patent
Ballard et al.

(10) Patent No.: US 6,195,637 B1
(45) Date of Patent: Feb. 27, 2001

(54) MARKING AND DEFERRING CORRECTION OF MISRECOGNITION ERRORS

(75) Inventors: Barbara E. Ballard, Raleigh, NC (US); Kerry A. Ortega, Deerfield Beach, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/048,504

(22) Filed: Mar. 25, 1998

(51) Int. Cl.[7] ................................................... G10L 15/08
(52) U.S. Cl. ........................... 704/235; 704/250; 704/256
(58) Field of Search ................................. 704/235, 250, 704/205, 256

(56) References Cited

U.S. PATENT DOCUMENTS

| | | | | |
|---|---|---|---|---|
| 5,799,273 | * | 8/1998 | Mitchell et al. | 704/235 |
| 5,799,279 | * | 8/1998 | Gould et al. | 704/275 |
| 5,855,000 | * | 12/1998 | Waibel et al. | 704/235 |
| 5,857,099 | * | 1/1999 | Mitchell et al. | 704/235 |
| 5,864,805 | * | 1/1999 | Chen et al. | 704/235 |
| 5,884,258 | * | 3/1999 | Rozak et al. | 704/251 |
| 5,899,976 | * | 5/1999 | Rozak | 704/270 |
| 6,006,183 | * | 12/1999 | Lai et al. | 704/235 |

* cited by examiner

Primary Examiner—David R. Hudspeth
Assistant Examiner—Daniel Abebe
(74) Attorney, Agent, or Firm—Quarles & Brady LLP

(57) ABSTRACT

A method for correcting misrecognition errors comprises the steps of: dictating to a speech application; marking misrecognized words during the dictating step; and, after the dictating and marking steps, displaying and correcting the marked misrecognized words, whereby the correcting of the misrecognized words is deferred until after the dictating step is concluded and the dictating step is not significantly interrupted. The displaying and correcting step can be implemented by invoking a correction tool of the speech application, whereby the correcting of the misrecognized words trains the speech application.

17 Claims, 3 Drawing Sheets

MARKING AND DEFERRING CORRECTION OF MISRECOGNITION ERRORS

BACKGROUND OF THE INVENTION

1. Field of the Invention

This invention relates generally to the field of speech recognition applications, and in particular, to a method for correcting dictation recognition errors.

2. Description of Related Art

Speech dictation systems improve over time if recognition of dictated words improves. The recognition of dictated words improves over time only if users take the time to correct misrecognized words. Thus, if a user sees an error, the user should correct the error. However, most users want to just finish their work and do not take the time to correct misrecognized words. Currently, it is often suggested that users dictate a paragraph and then correct the errors. Waiting any longer is likely to result in errors being overlooked or forgotten. According to presently accepted procedures to correct the errors, the user must first find the error or errors, then open a dialog box or window for correcting the error, and then make the correction, thus frequently interrupting the flow of the user's thoughts.

Error correction tools in speech applications now available, for example Vocabulary Expander, provides for automatically generating a list of words in the out of recognition category, that is, those words which appear to the speech application as having been misrecognized. This list is usually generated at the conclusion of dictation, although users can invoke the tool more frequently, at the cost of interrupting their dictation.

In order to improve speech recognition in speech systems, the user needs to correct the errors using the software application's correction method rather than just typing or dictating over the text. Only through such error correction does speech recognition improve. Accordingly, there is a long-felt and unsatisfied need to provide a method for error correction which does not interfere with or unduly interrupt the user's dictation.

SUMMARY OF THE INVENTION

In accordance with the inventive arrangements taught herein, this need is satisfied by a method which enables users to mark the misrecognition errors using a marking tool, and then at a later time, run a utility within the speech recognition application to correct the errors. This allows users to finish their work and then correct all the errors at once, instead of stopping every time they see an error or even at the end of every paragraph.

In a presently preferred embodiment, the misrecognized word or words can be marked as easily as highlighting or underlining the words as they appear on the screen, using a mouse or other pointing tool. The misrecognized words can also be marked by a speech command. Irrespective of the marking method, all misrecognized words can be marked for deferred correction, so that the user marked words and, if desired, additional words marked automatically by the application, can be corrected at the conclusion of the dictation. Marking and deferring correction of misrecognized words can significantly reduce the likelihood that misrecognized words will be missed, overlooked or forgotten.

A method for correcting misrecognition errors in accordance with an inventive arrangement comprises the steps of: dictating to a speech application; observing recognized words during the dictating step; marking misrecognized words during the dictating step; concluding dictation; and, displaying and correcting the marked misrecognized words, whereby the correcting of the misrecognized words is deferred until after the dictating step is concluded and the dictating step is not significantly interrupted.

The displaying and correcting step is advantageously implemented by invoking a correction tool of the speech application, whereby the correcting of the misrecognized words trains the speech application.

The marking step is implemented by activating a pointing tool or uttering voice commands or both.

The displaying and correcting step can comprise the steps of: sequentially displaying each sentence with a marked word; and, displaying a list of user selectable words to substitute for the marked word. The displaying and correcting step can further comprise the step of enabling users to enter a correction of the marked word by typing a word not on the list or by uttering a word not on the list.

The method displaying and correcting step can further comprise the step of enabling the user to select format corrections for the marked word in the sentence and for user selected text in the sentence.

The method can further comprise the step of generating a graphical user interface to implement the displaying and correcting step or generating respective graphical user interfaces for correcting text errors and format errors.

A method for correcting misrecognition errors in accordance with another inventive arrangement comprises the steps of: dictating to a speech application; marking misrecognized words during the dictating step; and, after the dictating and marking steps, displaying and correcting the marked misrecognized words, whereby the correcting of the misrecognized words is deferred until after the dictating step is concluded and the dictating step is not significantly interrupted. The displaying and correcting step is advantageously implemented by invoking a correction tool of the speech application, whereby the correcting of the misrecognized words trains the speech application.

DETAILED DESCRIPTION OF THE PREFERRED EMBODIMENTS

Figure 1:
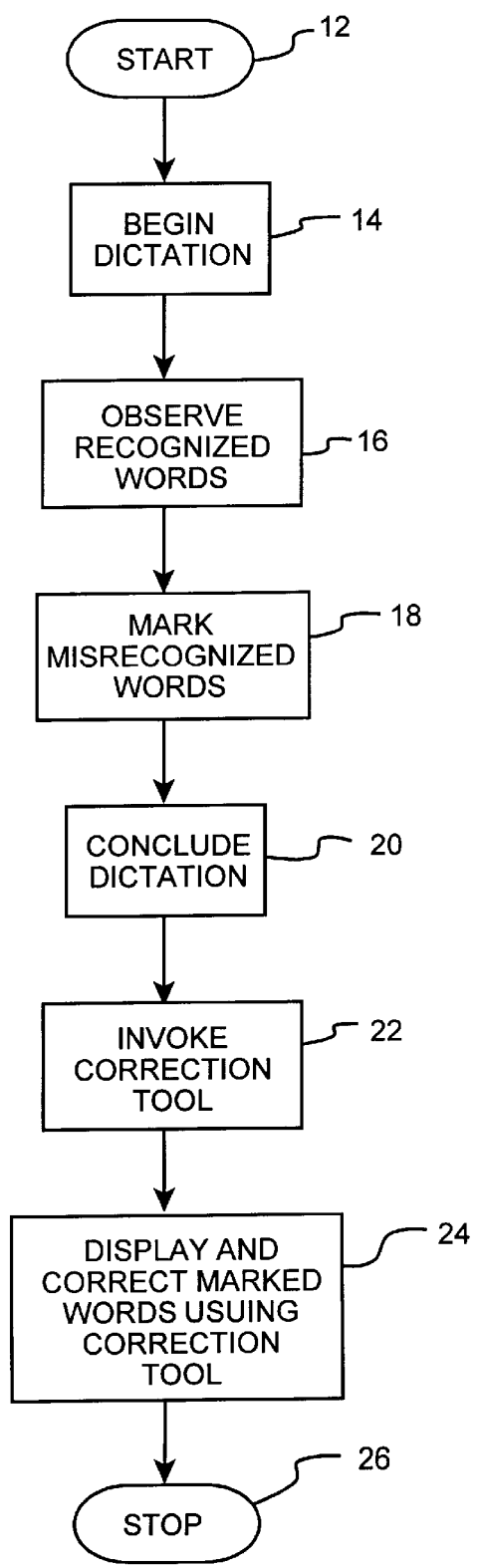
FIG. 1 is a flow chart useful for explaining a method for marking and deferring correction of misrecognition errors in a speech application in accordance with -he inventive arrangements.

A method for marking and deferring correction of misrecognized words in a dictation application, in accordance with the inventive arrangements, is shown in the flow chart 10 in FIG. 1. From the start block 12, the user begins to dictate to a speech application in accordance with the step of block 14. The recognized words appear on the screen as soon as the words are recognized, and are observed by the user in accordance with the step of block 16. This provides useful feedback for the user. As the dictation continues, the user may notice speech recognition errors in the text on the screen. The errors can be wrong words, incorrectly spelled words and improper format, for example a lack of upper case letters in a name or the wrong punctuation. In accordance with the inventive arrangements, the user can mark the misrecognized words or format mistakes with a marking tool in accordance with the step of block 18.

The misrecognized word or words can be marked as easily as highlighting or underlining the words as they appear on the screen, using a mouse or other pointing tool. It is expected that as users become experienced with the method, misrecognized words can be marked without interrupting dictation at all. The misrecognized words can also be marked by a speech command, for example, the user uttering "Correct <word errors Later", where "word error" is the misrecognized word or words.

After the conclusion of dictation in block 20, the user can invoke or run a correction tool or utility in accordance with the step of block 22. The correction tool serially displays each marked word and allows the user to correct each text or format error in accordance with the step of block 24. Correcting all errors with the utility or tool provides an opportunity for the speech application to learn new words and formats, which improves application performance in the future. When all of the marked words have been reviewed and corrected as necessary, the method stops in block 26. Correcting all errors at the conclusion of dictation reduces dictation time and improves efficiency.

Figure 2:
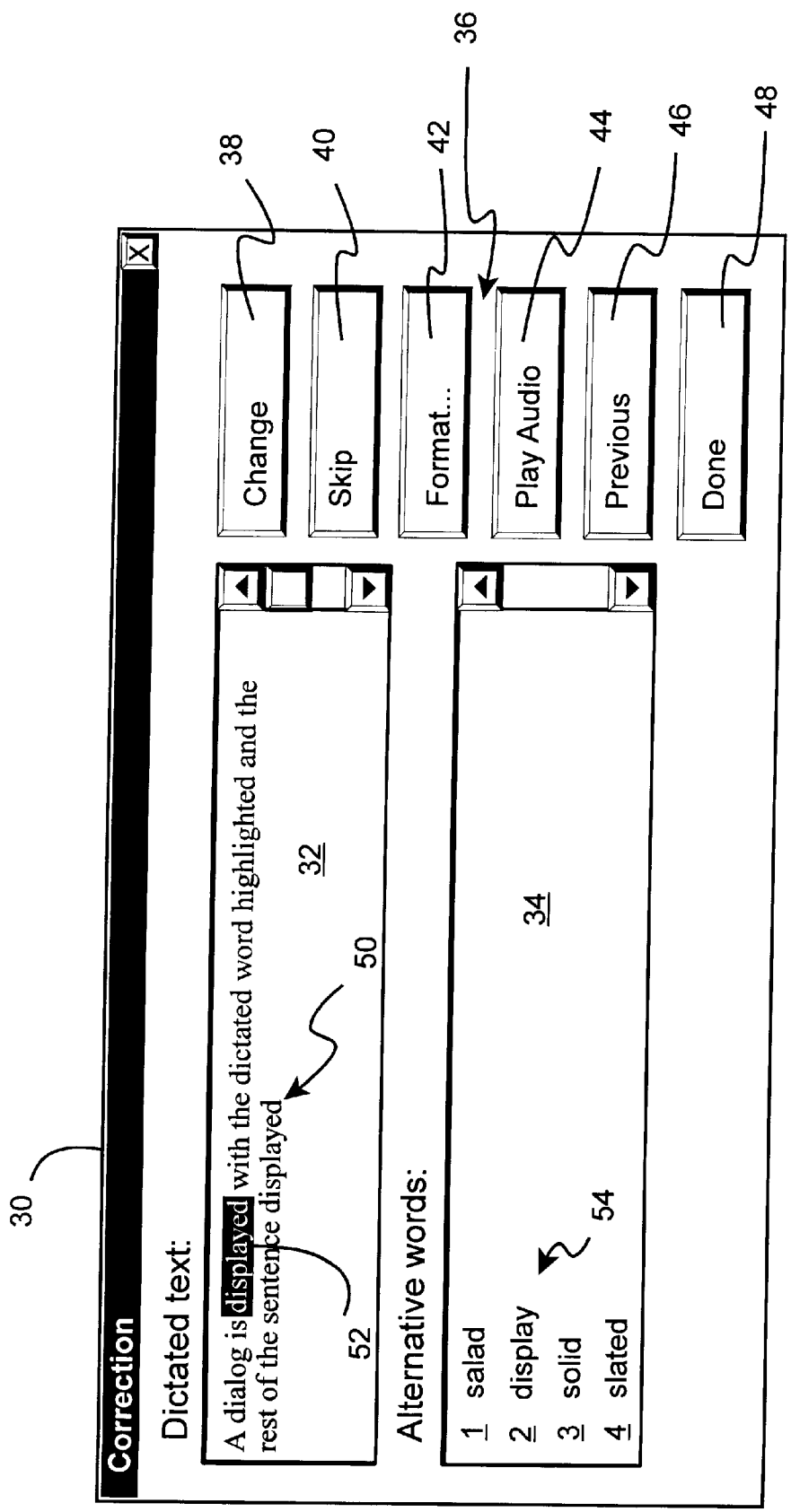
FIG. 2 is a graphical user interface window or dialog box useful for correcting text misrecognition errors in accordance with the inventive arrangements.
Figure 3:
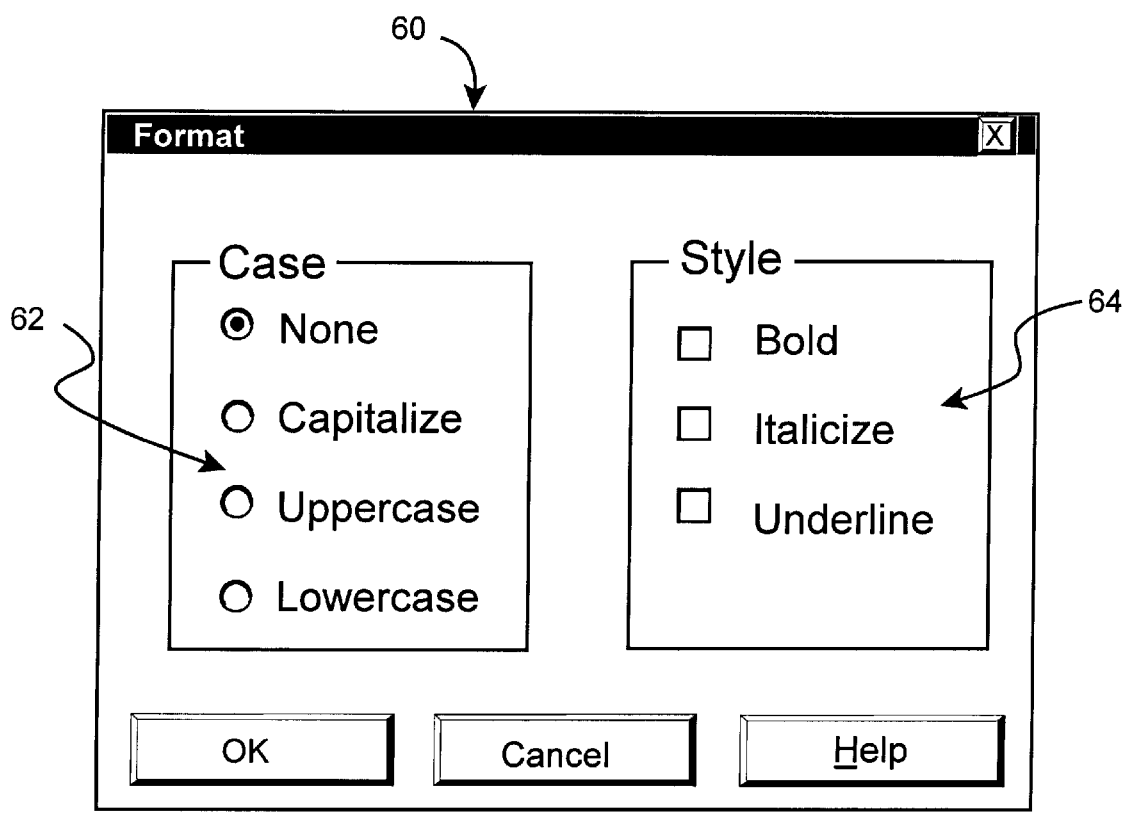
FIG. 3 is a graphical user interface window or dialog box useful for correcting format misrecognition errors in accordance with the inventive arrangements.

A graphical user interface window or dialog box 30 useful for correcting text misrecognition errors in accordance with the inventive arrangements is shown in FIG. 2. The dialog box 30 has a Dictated Text area 32, an Alternative Words area 34 and an area 36 for activatable function and command buttons.

Dictated Text area 32 is used for displaying each sentences or phrase 50, in which a word 52 marked for correction is highlighted or otherwise marked, for example by underlining or a is color change. The user can choose an alternative word in area 34 from a list 54 by clicking on the selected word in the list 54 of alternative words. If the list 54 does not contain the correct word, the user can change the selected text by clicking in the Dictated Text area 32, then typing or dictating the correct word, and then choosing the Change button 38 in area 36. The user can also select words or phrases in the sentence to correct them as well. Other command or function buttons available to the user are the Skip button 40, the Format button 42, the Play Audio button 44, the Previous button 46 and the Done button 48. When the user corrects a word as described above, or skips a marked word using button 40, the system displays the next marked word.

Activating the Format button 36 shows a graphical user interface window or dialog box 60 useful for correcting format misrecognition errors in accordance with the inventive arrangements. Revising format is not limited to errors, and can be used to revise any text marked in area 32 of dialog box 30. Dialog box 60 enables the user to set or change the case of the marked text in Case area 62 or the style of the marked text in Style area 64. Four common choices are shown in area 62. The user can select to Capitalize the first letters, also referred to as title case. The user can also select to have all Uppercase letters or all Lowercase letters. Three common style choices are shown in area 64, namely Bold, Italics and Underline. In either case, if there is no selection then the tool operates on the marked word.

With reference again to FIG. 2, the Play Audio button 44 plays the dictated audio of the sentence. If the sentence contains any non-dictated words, then text to speech is used to play those words. If the user makes a selection in the Dictated text then just the selected text is played. The Previous button 46 enables the user to go back to the previously marked word. The Done button 48 terminates the correction tool.

A key feature of the inventive arrangements enables the user to defer correction until a later time, thus completing dictation without significant interruption. This method enables users to identify errors the users have already found once, but did not correct, without requiring the user to go back and re-read all of the dictated text.

What is claimed is:

1. A method for correcting misrecognition errors, comprising the steps of:

accepting speech dictation in a speech dictation session;

accepting a user command to mark misrecognized words in said speech dictation during said speech dictation session;

responsive to said user command to mark said misrecognized words, marking said misrecognized words during said speech dictation session, but deferring correction of said marked misrecognized words until after said speech dictation session;

concluding said speech dictation session; and, displaying and correcting said marked misrecognized words subsequent to said speech dictation session, whereby said correcting of said misrecognized words is deferred until after said speech dictation session is concluded and said speech dictation session is not significantly interrupted.

2. The method of claim 1, wherein said displaying and correcting step is implemented by invoking a correction tool of said speech application, whereby said correcting of said misrecognized words trains said speech application.

3. The method of claim 1, wherein said user command to mark misrecognized words in said speech dictation during said speech dictation session is implemented by activating a pointing tool.

4. The method of claim 3, wherein said user command to mark misrecognized words in said speech dictation during said speech dictation session is implemented by uttering voice commands.

5. The method of claim 1, wherein said user command to mark misrecognized words in said speech dictation during said speech dictation session is implemented by uttering voice commands.

6. The method of claim 1, wherein correcting said words is implemented by activating a pointing tool.

7. The method of claim 1, wherein correcting said words is implemented by uttering voice commands.

8. The method of claim 1, wherein said displaying and correcting step comprises the step of:

sequentially displaying each sentence with a marked word; and, displaying a list of user selectable words to substitute for said marked word.

9. The method of claim 8, wherein said displaying and correcting step further comprises the step of enabling users to enter a correction of said marked word by typing a word not on said list.

10. The method of claim 8, wherein said displaying and correcting step further comprises the step of enabling users to enter a correction of said marked word by uttering a word not on said list.

11. The method of claim 1, wherein said displaying and correcting step further comprises the step of enabling said user to select format corrections for said marked word in said sentence and for user selected text in said sentence.

12. The method of claim 8, wherein said displaying and correcting step further comprises the step of enabling said user to select format corrections for said marked word in said sentence and for user selected text in said sentence.

13. The method of claim 12, further comprising the step of generating a graphical user interface to implement said displaying and correcting step.

14. The method of claim 12, further comprising the step of generating respective graphical user interfaces for correcting text errors and format errors.

15. The method of claim 1, further wherein said displaying and correcting step is implemented by generating respective graphical user interfaces for correcting text errors and format errors.

16. A method for correcting misrecognition errors, comprising the steps of:

accepting speech dictation in a speech dictation session;

accepting a user command to mark misrecognized words in said speech dictation during said speech dictation session;

responsive to said user command to mark said misrecognized words, marking said misrecognized words during said speech dictation session, but deferring correction of said marked misrecognized words until after said speech dictation session;

after said speech dictation session, displaying and correcting said marked misrecognized words, whereby said correcting of said misrecognized words is deferred until after said speech dictation session is concluded and said speech dictation session is not significantly interrupted.

17. The method of claim 16, wherein said displaying and correcting step is implemented by invoking a correction tool of said speech application, whereby said correcting of said misrecognized words trains said speech application.

* * * * *